Patented Oct. 14, 1941

2,259,306

UNITED STATES PATENT OFFICE 2,259,306

ELECTRIC SHOVEL CONTROL

William R. Harding, Murrysville, Pa., assignor to Westinghouse Electric & Manufacturing Company, East Pittsburgh, Pa., a corporation of Pennsylvania Application November 27, 1940, Serial No. 367,393

13 Claims. (Cl. 172—239)

My invention relates generally to control systems and particularly to control systems for electrically operated shovels, cranes, dredges and similar equipment.

Generally, electric generators used for electrically operated shovels for example, comprise three separate types of field windings; a separately excited shunt field winding, a self-excited shunt field winding and a differential series field winding.

The separately excited shunt field winding and the differential series field winding are designed to give a definite maximum current under stalled conditions and a definite maximum torque.

The self-excited field winding is used to give the desired slope to the volt ampere curve and to limit the rate of change of flux through the machine.

In the operation of electric shovels three conditions are encountered during the swing motion of the shovel which subject the generator to very different rates of flux change.

These conditions are as follows:

First, when starting up the swing motion of the shovel, it is desired that the generator reach the maximum current and maintain this current up to a high voltage. This requires a very fast separately excited field and a very fast self-excited field.

Second, while the shovel is rotating, if the shovel arm hits an obstruction, such as a bank of an excavation, while traveling at a high rate of speed, it is desired that the next inrush of current in the armature of the generator shall be kept as low as possible. This requires very fast current changes on both the separately excited and self-excited fields.

Third, it quite frequently occurs that when the shovel is rotating at its maximum speed, it is necessary for the operator to reverse the control. Since the shovel has considerable inertia, under these conditions, the peaked current of the generator is very high. Assume for example, a shovel generator with 5000 ampere turns per pole separately excited, 5000 ampere turns per pole self excited and 10 turns per pole of differential series field. The normal stalled current would be 500 amperes. But, if the inertia of the shovel is high and the fields are very fast, upon reversal, a current of 1000 amperes is approached. If the shovel has a no-load voltage of 500 volts at 5000 ampere turns of separate excitation, it would be necessary to supply the whole of 10,000 ampere turns by means of the series field and this would require 1000 amperes. Due to the time constants of the field and the slowing down of the shovel the 1000 amperes will not be reached, but the peaked current on reversal is much higher than the normal current of 500 amperes. This condition overloads the generator and the driving motor and puts excessive stresses on the gears.

The aforementioned undesirable conditions may be overcome by connecting a relay in control circuit relation with the generator field windings. It is this relay and the manner in which it is connected in control circuit relation with the generator field windings under different operating conditions of the shovel that contributes to the novelty of my invention.

It is, therefore, an object of my invention to provide a control system for an electrically operated shovel or similar apparatus that shall have a high degree of electrical control and be capable of maintaining a high degree of control regardless of the arduous operating conditions to which the shovel may be subjected.

Another object of my invention is to provide a control system for an electrically operated shovel or similar apparatus which shall be capable of preventing overloads on the generator and driving motor and also stresses on mechanical parts.

A further object of my invention is to provide a control system for an electrically operated shovel or similar apparatus which shall protect the generator against high peaked current ordinarily caused by sudden reversals of the controller.

Other objects of my invention will become evident from the following detailed description, taken in conjunction with the accompanying drawings, in which Figure 1 is a schematic circuit diagram of a control system for an electrically operated shovel or the like embodying the principles of my invention;

Figure 1:
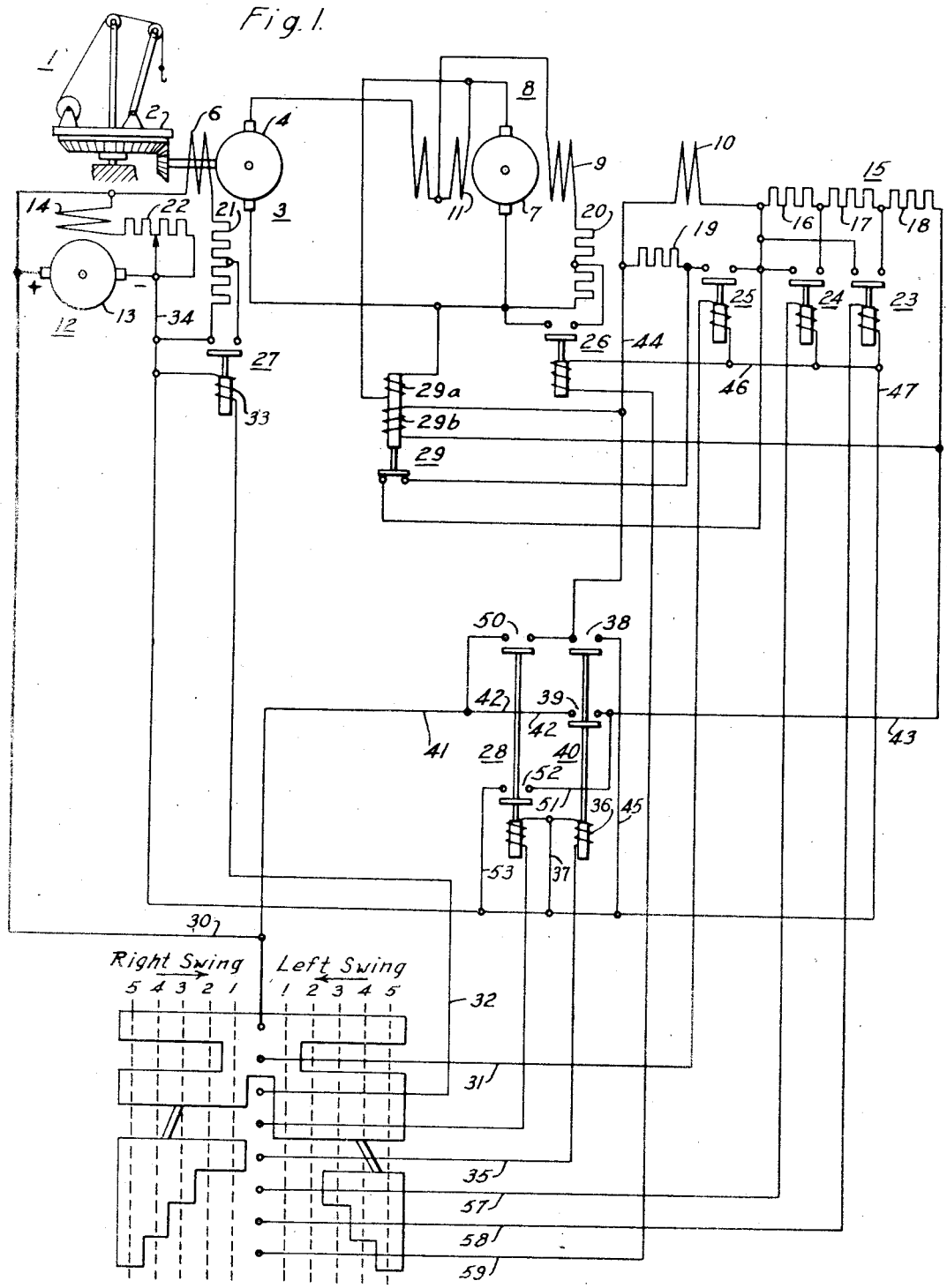
Figure 2:
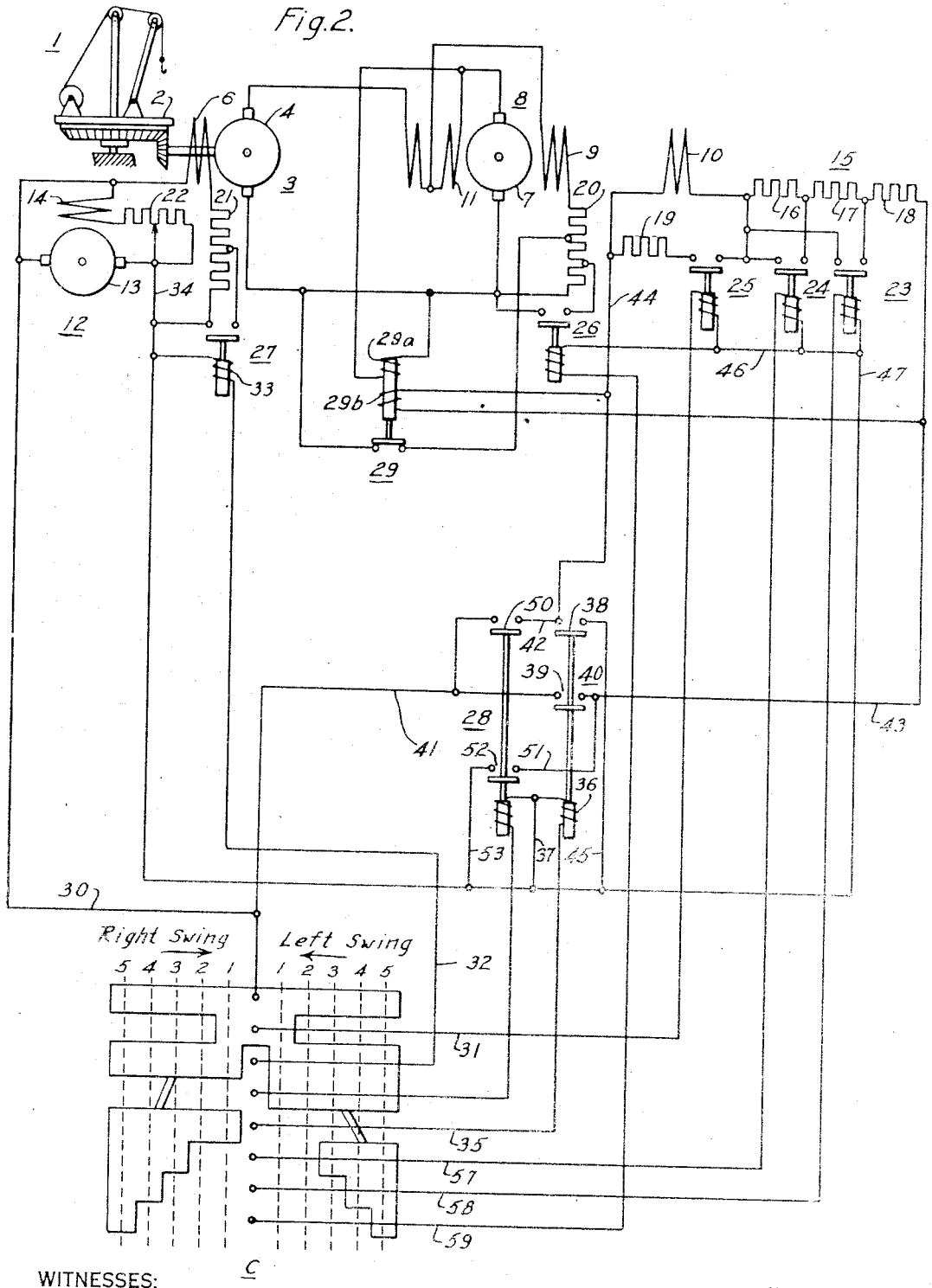
Fig. 2 is a schematic circuit diagram of a control system for an electrically operated shovel or the like embodying a modification of the system shown in Fig. 1.

Referring generally to Figs. 1 and 2 of the drawings, there is shown diagrammatically an electrically operated shovel 1, having a turntable 2, adapted to be rotated by a driving motor 3. The motor 3 comprises the usual armature 4, and a shunt field winding 6. The driving motor 3 is energized by a multi-winding generator 8, comprising an armature 7, a self-excited shunt field winding 9, a separately excited shunt field winding 10, and a differential series field winding 11.

The generator 8 is driven by a prime mover, such as a motor, gas engine, or other suitable type of prime mover (not shown).

An exciter 12, having an armature 13, and a shunt field winding 14, is provided to energize the windings of the motor 3 and the generator 8. The exciter 12 is also driven by any suitable type of prime mover (not shown) and may, in fact, be coupled to the shaft of the same prime mover that drives the generator 8.

Various field control resistors 15, 16, 17, 18, 19, 20, 21 and 22, and various control relays 23, 24, 25, 26 and 27, are provided to control the fields under different operating conditions of the shovel.

Relays 28 and 40 are provided for reversing the direction of the separately excited shunt field winding 10.

A double-coil relay 29 is provided to control the separately excited shunt field winding 10 of the generator 8. It is this relay 29 and the functioning thereof together with the other circuit elements of the control system that contributes essentially to the novelty of my invention.

A master controller C is provided to completely control the various circuits of the control system and consequently the swing operation of the shovel.

The function of the resistors, relays and other circuit elements with respect to the associated fields will be more fully explained hereinafter.

Referring more particularly to Figure 1 of the drawings.

It will be apparent that by varying the field strength of the separately excited field winding 10, the speed of motor 3 may be controlled. Likewise, by controlling the direction of current flow through the separately excited field winding 10, the direction of rotation of the motor 3 may be controlled.

The essence of my invention centers about the field weakening double coil relay 29 for the separately excited shunt field 10, essentially comprising a coil 29a which is energized by the voltage across the generator and a coil 29b which is connected across the separately excited field 10 and resistor 15 so as to be responsive to the voltage applied to the separately excited field winding 10 by the exciter 13.

The operation of the device in complete detail is as follows: Assume that it is desired to drive motor 3 in a particular direction, say the "right swing" direction. Controller C is moved to the number 1 "right swing" position, thereby completing a circuit from the (+) terminal or conductor 30 through conductor 32, coil 33 to the (—) terminal or conductor 34. This will effect closing of contact members of relay 27 which will in turn shunt a portion of the resistor 21 so as to increase current flow through the motor winding 6. Another circuit would be completed from the (+) terminal through conductor 35, actuating coil 36, conductor 37 to the (—) terminal, thereby effecting closing of contact members 38 and 39 of the "right swing" contactor 40. This will effect completion of still another circuit which may be traced from the (+) terminal through conductors 41 and 42, contact members 39, conductor 43, resistor 15, separately excited field winding 10, conductor 44, contact members 38, conductor 45 to the (—) terminal. During the "off" position, as well as the first position, either right or left of the controller, a circuit will be completed from the (+) terminal through conductor 31, actuating coil of relay 25, conductors 46 and 47 to the (—) terminal, thereby effecting closing of the contact members of relay 25, which in turn shunt the field discharge resistor 19 across the field winding 10, as is well known in the art. Relay 29 will pick up since an energizing circuit is completed through coil 29b. Furthermore, the gradual building up of the generator voltage causes a gradual increase in magnetomotive force of coil 29a which aids more and more in keeping relay 29 in the picked up position (since the coils are of the same polarity). The separately excited field is therefore at full strength during starting up of the motor in the right (or left) swing direction. In positions other than the first position, either right or left, coil of relay 25 will be deenergized; hence the field discharge resistor circuit will be interrupted. In the third, fourth, and fifth, right (or left) positions, a circuit will be completed through conductors 57, 58, 59, respectively, and will effect energization of actuating coils of relays 24, 23 and 26, respectively, which in turn effect shunting of resistor portions 16, 16 plus 17 and the lower portion of resistor 20, respectively, as will be readily apparent from inspection of the control diagram. This successive shunting of resistors provides a progressive voltage control for generator 8. It will be apparent from the symmetry of the contact segments of controller C that the same succession of contact closing is likewise effective in the left direction of movement of the controller C. The difference when controller C is operated in the left direction is that "left swing" relay 28 instead of "right swing" relay 40 is energized; hence, the direction of current flow through the separately excited field winding is reversed, that is, the current flow may now be traced from the (+) terminal through conductor 41 through contact members 50, conductor 44, field winding 10, resistor 15, conductors 43 and 51, contact members 52, conductor 53 to the (—) terminal.

When controller C is moved from the "right swing" direction to the "left swing" direction, the generator voltage does not collapse immediately since the self-excited field 9 of the generator which is under this condition supplied with voltage from the motor due to regeneration tends to maintain the generator voltage. The current that flows through the generator differtial field 11 during retardation is also in a direction that assists in maintaining the generator voltage.

It is, of course, very desirable that the generator voltage not collapse instantaneously, otherwise excessive current would be generated by the motor and retardation would be so rapid as to severely stress the apparatus, being retarded.

Figure 3:
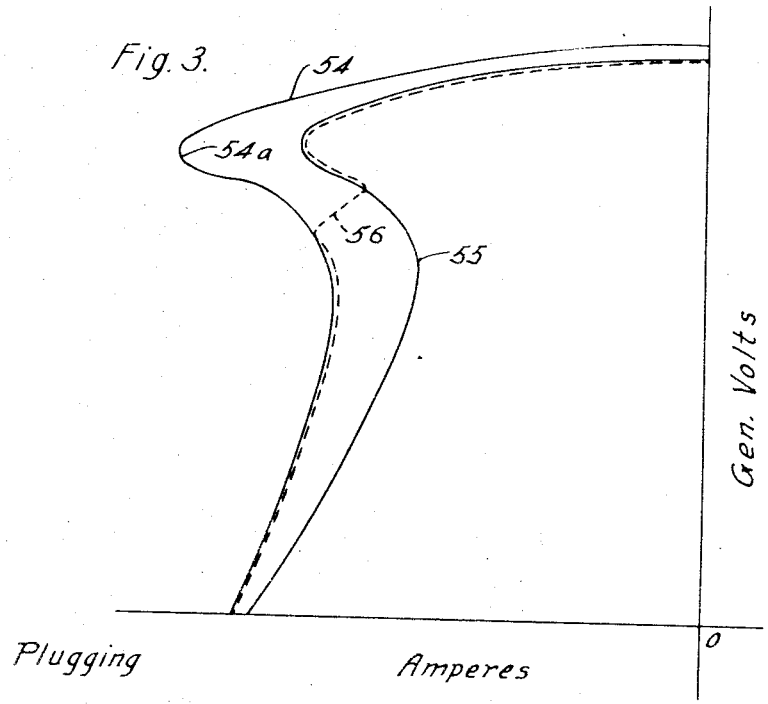
Fig. 3 shows curves illustrating characteristics obtained by my invention.

As stated before, the essence of the invention centers about the operation of relay 29 in alternately weakening and strengthening the separately excited shunt field winding 10 by either completion or interruption of a shunt circuit through resistor 19. The significance of the operation of relay 19 may be more apparent by first studying certain difficulties encountered in the plugging operation of conventional variable voltage systems. Referring more particularly to Fig. 3, curve 54 shows a certain current charcteristic for a predetermined field strength of separately excited field 10. It will be noted that this curve represents the characteristic encountered after the plugging or reversing operation at which time there occurs a considerable peaked current, that is, one which attains a maximum value at point 54a as an immediate consequence of the plugging operation which current, however, gradually decreases to a safe value. Such peaked current is very undesirable, inasmuch as it not only causes severe commutation trouble, but causes a considerable jarring or strain on the gears during reversal which is apt to be damaging to the shovel drive. One way of decreasing this peaked current is to provide a weaker separately excited field which would result in a characteristic such as indicated by curve 55. While this gives a smaller peaked current, it has the disadvantage that after the peak has subsided, the current decreases to such an extent that torque and acceleration (which are proportional to the current) correspondingly decrease, thereby impeding the speed of operation of the shovel during reversal resulting in sluggish or slow operation. Curve 54, on the other hand, while disadvantageous because of the excessive peaked current, has an advantage over curve 55 during the period following the peaked current in that it develops a higher current, consequently affords higher acceleration during the reverse swing motion of the shovel.

In accordance with my invention, I have succeeded in deriving the advantages of both of these curves and at the same time eliminating the disadvantages thereof. In other words, I have been able to obtain a charcteristic such as indicated by the dotted curve 56 which coincides with curve 55 immediately following the plugging operation, therefore developing a moderate peaked current which is of safe value, and thereafter departs from curve 55 and coincides with curve 54, so as to subsequently develop a higher current resulting in higher acceleration of the shovel in a reverse direction.

Figure 4:
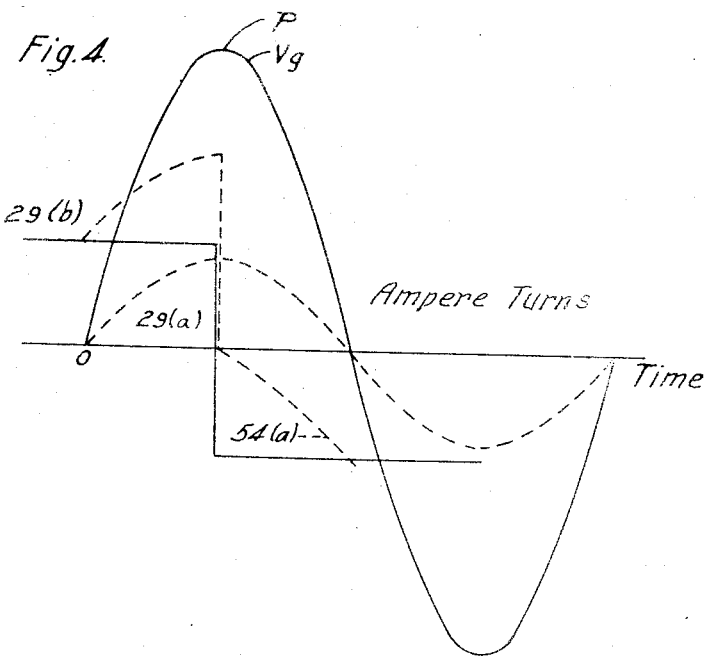
Fig. 4 shows curves illustrating the operation of the double coiled relay 29 which is the essence of my invention.

This characteristic as represented by curve 56 is obtained by the operation of relay 29. Assume that the controller C has been moved to the "right swing" position, thereby immediately effecting a fixed energization of coil 29a and a progressive energization of coil 29b, as illustrated in Fig. 4, wherein the magnetomotive force or ampere turns is plotted against time. The resultant energization of relay 29 is represented by the sum of these two curves which is denoted as 29b plus 29b in Fig. 4. Curve Vg represents the terminal voltage of the generator.

From a study of the curves it will be noted that starting from zero time to point P on the Vg curve the magnetomotive forces of both coils of relay 29 are additive, which means that the relay will be picked up and held up so as to allow full field strength of separately excited field 10. However, when controller C is moved in a reverse direction, say from the "right swing" to the "left swing" direction, which occurs at point P, the resultant magnetomotive force of the two coils immediately becomes zero and then gradually increases in the opposite direction. In other words, the polarity of coil 29b is reversed, hence the ampere turns produced thereby substantially nullifies the ampere turns produced by coil 29a thereby allowing relay 29 to drop and close its contacts, thus shunting field 10 across resistor 19. This will effect weakening of the field, therefore will give a characteristic which coincides with the upper part of curve 55. However, when the magnetomotive force builds up to a predetermined extent in the reverse direction as a consequence of the gradual decrease in generator voltage, the relay again picks up, say at a point 54a, thereby causing a transfer from curve 55 to curve 54 (see Fig. 3) which means that the field winding 10 is again energized on full strength so as to increase the acceleration in the reverse direction. By suitably adjusting coils 29, 29a and 29b, this transfer may occur at any time following plugging. Of course, to have its maximum usefulness it should occur after the peaked curve has subsided which is usually within the upper fifth range of normal generator no-load voltage. It is highly desirable to get this transfer immediately following the occurrence of the peaked current so as to maintain a high degree of acceleration of the shovel during reversal.

It will be apparent that instead of shunting the separately excited field 10 to weaken it, it is possible instead to merely insert more resistance in series therewith.

Substantially the same effect as described above can be acquired by strengthening the self-excited shunt field 9 instead of field 10 at the same moments described above. Fig. 2 shows such arrangement and the only difference between Fig. 2 and Fig. 1 is that in Fig. 2 relay 29 effects shunting of the lower portion of resistor 20 in series with the field 9 in order to strengthen it instead of shunting the field 10 through resistor 19 as shown in Fig. 1.

Similarly, other arrangements can be found for accomplishing substantially the same function. For instance, it may be possible to connect coil 29a as shown, but to connect 29b in series with differential series field 11 and the self-excited field 9 and the motor armature 4. It will be noted that after a no-load voltage in the reverse direction has been obtained, if it is then desired to move the controller to its original position (in other words, to plug again) substantially the same action will take place, that is, the field strength of winding 10 will be immediately decreased momentarily and then, following occurrence of the peaked current, will increase for the same reasons explained above.

I am, of course, aware that others, particularly after having had the benefit of the teachings of my invention, may devise other devices embodying my invention, and I, therefore, do not wish to be limited to the specific showings made in the drawings and the descriptive disclosure hereinbefore made, but wish to be limited only by the scope of the appended claims and such prior art that may be pertinent.

I claim as my invention:

1. In a variable voltage control system including a generator having a self-excited shunt field winding and a separately excited shunt field winding, a source of energizing potential therefor, and a motor energized by said generator, a relay having two coils thereon, one of which is energized by the voltage of the generator and the other of which is energized by a voltage proportional to that of the separately excited field winding, and reversing means for said motor including switching means for reversing the direction of current flow from said source through said separately excited field winding, said relay having contact members in circuit relationship with said separately excited field whereby said relay is effective to minimize peak currents during reversal and at the same time maintain high torque and acceleration during reversal.

2. In a variable voltage control system including a generator having a self-excited shunt field winding and a separately excited shunt field winding, a source of energizing potential therefor, and a motor energized by said generator, a relay having two coils thereon, one of which is energized by the voltage of the generator and the other of which is energized by a voltage proportional to that of the separately excited field winding, and reversing means for said motor including switching means for reversing the direction of current flow from said source through said separately excited field winding, said relay having contact members in circuit relationship with said separately excited field and having its coils wound and adjusted so that they effect weakening of the separately excited field immediately following operation of said reversing switching means thereby minimizing high peaked currents ordinarily obtainable upon plugging.

3. In a variable voltage control system including a generator having a self-excited shunt field winding and a separately excited shunt field winding, a source of energizing potential therefor, and a motor energized by said generator, a relay having two coils thereon, one of which is energized by the voltage of the generator and the other of which is energized by a voltage proportional to that of the separately excited field winding, and reversing means for said motor including switching means for reversing the direction of current flow from said source through said separately excited field winding, said relay having contact members in circuit relationship with said separately excited field so as to weaken said separately excited field only for a short period of time following reversal of the direction of current flow therethrough as effected by said reversing means.

4. In a variable voltage control system including a generator having a self-excited shunt field winding and a separately excited shunt field winding, a source of energizing potential therefor, and a motor energized by said generator, a relay having two coils thereon, one of which is energized by the voltage of the generator and the other of which is energized by a voltage proportional to that of the separately excited field winding, and reversing means for said motor including switching means for reversing the direction of current flow from said source through said separately excited field winding, said relay having contact members in circuit relationship with said separately excited field so as to weaken said separately excited field only for a short period of time following reversal of the direction of current flow therethrough as effected by said reversing means, said relay coils being so adjusted that said separately excited field is strengthened again immediately following occurrence of the peaked generator current accompanying reversal due to a predetermined dying down of the self-excited field.

5. In a variable voltage control system including a generator having a self-excited shunt field winding and a separately excited shunt field winding, a source of energizing potential therefor, and a motor energized by said generator, a relay having two coils thereon, one of which is energized by the voltage of the generator and the other of which is energized by a voltage proportional to that of the separately excited field winding, and reversing means for said motor including switching means for reversing the direction of current flow from said source through said separately excited field winding, said relay having contact members which are effective to shunt said separately excited field winding immediately following operation of said reversing switching means but which normally permits a full field during starting of said motor and during a predetermined time following operation of said switching means.

6. In a variable voltage control system including a generator having a self-excited shunt field winding and a separately excited shunt field winding, a source of energizing potential therefor, and a motor energized by said generator, a relay having two coils thereon, one of which is energized by the voltage of the generator and the other of which is energized by a voltage proportional to that of the separately excited field winding, and reversing means for said motor including switching means for reversing the direction of current flow from said source through said separately excited field winding, said relay having contact members which are effective to weaken said separately excited field winding upon operation of said reversing switching means and which will allow said separately excited field to have full strength during starting of the motor and during a predetermined time following occurrence of peak currents at reversal of said motor.

7. In a variable voltage control system including a generator having a self-excited shunt field winding and a separately excited shunt field winding, a source of energizing potential therefor, and a motor energized by said generator, a relay having two coils thereon, one of which is energized by the voltage of the generator and the other of which is energized by a voltage proportional to that of the separately excited field winding, and reversing means for said motor including switching means for reversing the direction of current flow from said source through said separately excited field winding, said relay having contact members in circuit relationship with said separately excited field winding so as to effect weakening of the separately excited field at the moment of operation of said reversing switching means and to effect strengthening of said last mentioned field a predetermined time after the peaked generator current caused by reversal has died down to a safe value.

8. In a variable voltage control system including a generator having a self-excited shunt field winding and a separately excited shunt field winding, a source of energizing potential therefor, and a motor energized by said generator, a relay having two coils thereon, one of which is energized by the voltage of the generator and the other of which is energized by a voltage proportional to that of the self-excited field winding, and reversing means for said motor including switching means for reversing the direction of current flow from said source through said separately excited field winding, said relay having contact members in circuit relationship with said separately excited field whereby said relay is effective to minimize peak currents during reversal and at the same time maintain high torque and acceleration during reversal.

9. In a variable voltage control system including a generator having a self-excited shunt field winding and a separately excited shunt field winding, a source of energizing potential therefor, and a motor energized by said generator, a relay having two coils thereon, one of which is energized by the voltage of the generator and the other of which is energized by a voltage proportional to that of the self-excited field winding, and reversing means for said motor including switching means for reversing the direction of current flow from said source through said separately excited field winding, said relay having contact members in circuit relationship with said separately excited field and having its coils wound and adjusted so that they effect weakening of the separately excited field immediately following operation of said reversing switching means thereby minimizing high peaked currents ordinarily obtainable upon plugging.

10. In a variable voltage control system including a generator having a self-excited shunt field winding and a separately excited shunt field winding, a source of energizing potential therefor, and a motor energized by said generator, a relay having two coils thereon, one of which is energized by the voltage of the generator and the other of which is energized by a voltage proportional to that of the self-excited field winding, and reversing means for said motor including switching means for reversing the direction of current flow from said source through said separately excited field winding, said relay having contact members in circuit relationship with said separately excited field so as to weaken said separately excited field only for a short period of time following reversal of the direction of current flow therethrough as effected by said reversing means.

11. In a variable voltage control system including a generator having a self-excited shunt field winding and a separately excited shunt field winding, a source of energizing potential therefor, and a motor energized by said generator, a relay having two coils thereon, one of which is energized by the voltage of the generator and the other of which is energized by a voltage proportional to that of the self-excited field winding, and reversing means for said motor including switching means for reversing the direction of current flow from said source through said separately excited field winding, said relay having contact members in circuit relationship with said separately excited field whereby said relay is effective to minimize peak currents during reversal and at the same time maintain high torque and acceleration during reversal, said relay coils being so adjusted that said separately excited field is strengthened again immediately following occurrence of the peaked generator current accompanying reversal due to a predetermined dying down of the self-excited field.

12. In a variable voltage control system including a generator having a self-excited shunt field winding and a separately excited shunt field winding, a source of energizing potential therefor, and a motor energized by said generator, a relay having two coils thereon, one of which is energized by the voltage of the generator and the other of which is energized by a voltage proportional to that of the self-excited field winding, and reversing means for said motor including switching means for reversing the direction of current flow from said source through said separately excited field winding, said relay having contact members which are effective to weaken said separately excited field winding upon operation of said reversing switching means and which will allow said separately excited field to have full strength during starting of the motor and during a predetermined time following occurrence of peak currents at reversal of said motor.

13. In a variable voltage control system including a generator having a self-excited shunt field winding and a separately excited shunt field winding, a source of energizing potential therefor, and a motor energized by said generator, a relay having two coils thereon, one of which is energized by the voltage of the generator and the other of which is energized by a voltage proportional to that of the self-excited field winding, and reversing means for said motor including switching means for reversing the direction of current flow from said source through said separately excited field winding, said relay having contact members in circuit relationship with said separately excited field winding so as to effect weakening of the separately excited field at the moment of operation of said reversing switching means and to effect strengthening of said last mentioned field a predetermined time after the peaked generator current caused by reversal has died down to a safe value.

WILLIAM R. HARDING.